(12) United States Patent
Kumaran (10) Patent No.: US 8,145,672 B2
(45) Date of Patent: Mar. 27, 2012

(54) METHOD FOR CLUSTERING OF LARGE HIGH-DIMENSIONAL DATASETS

(75) Inventor: Krishnan Kumaran, Raritan, NJ (US)

(73) Assignee: Exxonmobil Research and Engineering Company, Annandale, NJ (US)

( * ) Notice: Subject to any disclaimer, the term of this patent is extended or adjusted under 35 U.S.C. 154(b) by 244 days.

(21) Appl. No.: 12/586,827

(22) Filed: Sep. 29, 2009

(65) Prior Publication Data

US 2010/0121851 A1 May 13, 2010

Related U.S. Application Data

(60) Provisional application No. 61/195,814, filed on Oct. 10, 2008.

(51) Int. Cl.
*G06F 17/00* (2006.01)
(52) U.S. Cl. ......... 707/791; 707/802; 707/822; 707/828
(58) Field of Classification Search ........... 707/600–831
See application file for complete search history.

(56) References Cited

U.S. PATENT DOCUMENTS

| | | | |
|---|---|---|---|
| 7,034,738 B1 * | 4/2006 | Wang et al. ............ | 342/13 |
| 7,406,200 B1 | 7/2008 | Syeda-Mahmood et al. | |
| 2002/0167314 A1 | 11/2002 | Prammer | |
| 2003/0206489 A1 | 11/2003 | Preston et al. | |
| 2004/0267686 A1 | 12/2004 | Chayes et al. | |
| 2005/0010093 A1 | 1/2005 | Ford et al. | |
| 2006/0093188 A1 | 5/2006 | Blake et al. | |

* cited by examiner

*Primary Examiner* — Isaac M Woo
(74) *Attorney, Agent, or Firm* — R. D. Hartman (57) ABSTRACT

The present invention is a method for clustering data points. The method represents data-points as vertices of a graph (a well-known mathematical construct) with distance-weighted arcs (lines joining each paid of points). The method then involves sorting the arcs in increasing order of their weights and adding them in ascending order, at each stage determining the number of connected components in the graph and the length of the longest added edge. The longest edge is a measure of the quality of the clustering (low values are good), and the connected components are the clusters.

7 Claims, 8 Drawing Sheets

Example with intermeshed wedges. Note that the 2-cluster result agrees well with the natural grouping. Maximum number of clusters in the efficient spectrum ($N^*$) is 51.

Trade-off curve (Top plot-upper) and concave lower bound (top plot-lower) show "knee" at 51 clusters. Bottom plot shows cluster size distribution for 51 clusters.

FIG 4

Example with concentric annular regions. Note the 6 cluster result picks out the natural 6 clusters. Maximum number of clusterings consistent with the algorithm's quality measure ($n'$) is 25.

Trade-off curve (Top plot-upper) and concave lower bound (top plot-lower) show "knee" at 25 clusters. Bottom plot shows cluster size distribution for 25 clusters.

FIG. 6

K-Means algorithm does not produce reasonable results for any choice of number of clusters

FIG 7

METHOD FOR CLUSTERING OF LARGE HIGH-DIMENSIONAL DATASETS

This Application claims the benefit of U.S. Provisional Application 61/195,814 filed Oct. 10, 2008.

BACKGROUND OF THE INVENTION

The present invention relates to data clustering. In particular, the present invention relates to method of graph-based clustering of large datasets.

Clustering of large datasets is a long-standing problem in statistical analysis and there is a vast amount of literature on this subject in various mathematical fields including statistics, optimization and operations research, and computer science. In particular, popular methods known as K-means clustering, Classification and Regression Trees (CART), Bayesian methods and many of their variants are commonly available in most popular data processing software such as Matlab's statistics toolbox, S-Plus, SAS etc. Nevertheless, some of these methods, such as K-means clustering, are often non-robust, in the sense that repeated runs of the algorithms on the same data from different starting points gives different results. Further, most of the methods require specifying the number of clusters desired in advance, and the user is often unlikely to know this information in advance for complex datasets. Finally, these methods often involve substantial computational complexity for large datasets, and often many repeated runs are necessary before the user is satisfied that the results are reliable.

The present invention is a very useful statistical tool applied to refinery process data. Refinery processes are usually monitored with the help of a large number of instruments that send periodic (typically every second) information back to central monitoring station. This streaming data is monitored both manually as well as automatically by computer software that may use deterministic rules (expert systems) and/or statistical criteria. The process can evolve into an abnormal state (unsafe and/or inefficient) in a large variety of ways, and in a well-designed system, the rules and statistical criteria will indicate the occurrence of the abnormality as early as possible so that corrective action can prevent further damage. In addition, the present invention is useful for data analysis of data produced by Model Predictive Control (MPC) and Real Time Optimization (RTO).

SUMMARY OF THE INVENTION

The present is a method for clustering data that includes a clustering algorithm that overcomes these drawbacks of the prior art, i.e. it (i) produces robust and unique solutions for each dataset and given number of clusters (ii) provides methods to evaluate the quality of clustering, and hence choose the number of clusters (iii) has lower computational burden compared to existing alternatives. The method is based on representing data-points as vertices of a graph (a well-known mathematical construct) with distance-weighted arcs (lines joining each pair of points). The method then involves sorting the arcs in increasing order of their weights and adding them in ascending order, at each stage determining the number of connected components in the graph and the length of the longest added edge. The longest edge is a measure of the quality of the clustering (low values are good), and the connected components are the clusters. Ideal choices for the number of clusters can then be obtained by selecting the clusterings that offer significant reduction in quality compared to the previous value. The simplicity of this algorithm is responsible for its low computational burden, and its mathematical properties can be easily analyzed to show that it produces a unique solution for each choice of number of clusters, while the quality measure enables choosing among these clusterings.

DETAILED DESCRIPTION OF THE PREFERRED EMBODIMENTS

Clustering and classification are widely used in all industries with large amounts of data that need to be analyzed for process improvement and control. Clustering is used in a number of applications ranging from analysis of data in refineries and chemical plants, seismic data processing, and high throughput data analysis in chemicals. Improving the quality and usability of clustering techniques can enhance these data analysis tasks substantially.

Clustering is a long-standing area with several decades of research in the statistics, mathematics and computer science communities. Almost all standard data processing software includes established methods for clustering such as K-means, CART, and to a lesser extent Bayesian methods. Commonly used software include Matlab, Spotfire, S-Plus, Mathematical and other such tools with implementations of some of these algorithms.

Algorithm Description

Figure 1:
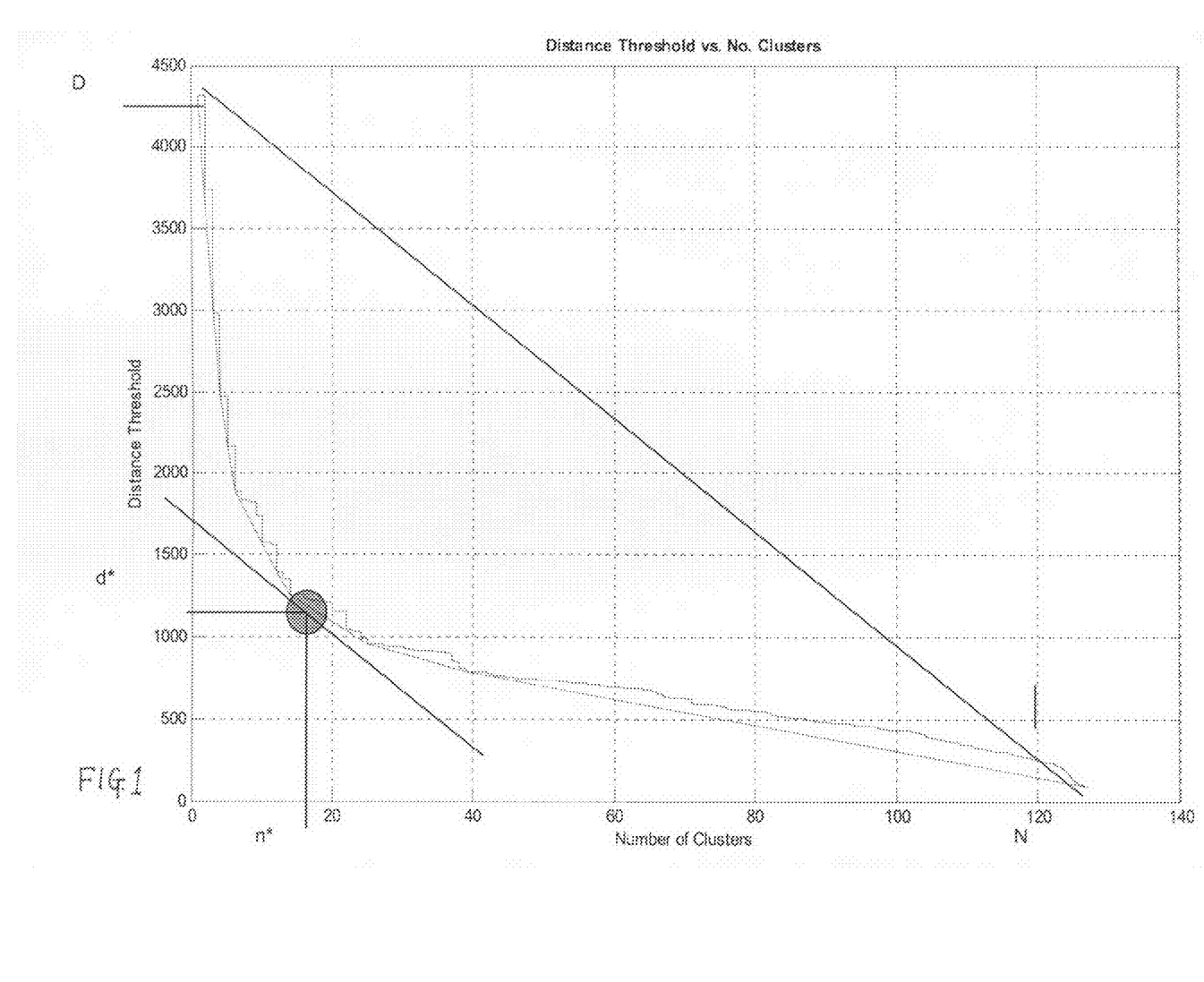
FIG. 1 shows MaxL vs. NC and its convex lower envelope. The "knee" of the curve (circle) is obtained by moving the line joining endpoints of the curve to the closest position towards the origin.

Consider N points in D-dimensions specified by vectors $\{x_i: i=1,2,\ldots N\}$. Let $D=\{d_{ij}: i,j=1,2,\ldots N; i<j\}$ represent the Distance Matrix containing pairwise distances between the points. The algorithms then proceeds as follows:

1. Sort the distances in ascending order so that the marix Dsort is a collection of triplets $\text{Dsort}=\{(ds_k, i_k, j_k): k=1, \ldots N(N-1)/2; ds_k \leq ds_{k+1}; i_k < j_k\}$.
2. Start with a collection of points not connected to one another, and initialize Number of Clusters NC=N and Longest edge length MaxL=0.
3. In the kth step of the algorithm, add the kth edge from Dsort and update $\text{MaxL}=ds_k$. Check whether the newly added edge caused a merging of two previously distinct clusters. If so, decrement NC by 1, i.e. NC→NC−1.
4. Continue until NC=1 or k=N.
5. Plot MaxL vs. NC, see FIG. 1. This should be a monotonically decreasing plot ending at MaxL=0 when NC=N, marked by sharp jump transitions in the middle as shown by the blue curve above. FIG. 1 shows MaxL vs. NC and its Convex Lower Envelope. The "knee" of the curve (circle) is obtained by moving the line joining endpoints of the curve to the closest position towards the origin.

6. Compute the convex lower envelope of MaxL vs. NC. This is illustrated in the FIG. 1 as the bounding curve at the bottom. Although standard, we recall the following mathematical definition of the convex envelope for later convenience.
7. Extract the "knee" of the convex envelope as a cut-off point marking diminishing returns with increasing number of clusters. The following scale-invariant mathematical definition of this point identifies it uniquely as the point on the convex envelope with smallest projected distance to the origin, where the projection is orthogonal to the line joining the endpoints of the curve.

$$(n^*, d^*) = \underset{d,n \in Conv.Env.}{\text{Arg Min}} \frac{n-1}{N-1} + \frac{d}{D}$$

This point is represented pictorially in FIG. 1 above by a circle, and is obtained simply by translating the line joining the endpoints of the curve as close to the origin as possible. The scale invariance follows from the fact that applying an arbitrary scaling factor to the distance values d makes no difference to the clusterings chosen or the value of $n^*$.

8. Finally, all clusterings that lie on the convex envelope with $n \leq n^*$ can potentially be considered "good" solutions, in the sense that they provide an efficient spectrum that trades off simplicity of representation with detail. Thus $n^*$ represents the maximum number of clusters in the efficient spectrum.

The above algorithm has a simple structure, but produces very intuitive clustering results, as we will show in the next section. Unlike most existing techniques, it is not based on optimizing any particular criteria explicitly such as squared distances from centroids, or Bayesian probability measures. However, it does optimize an objective function implicitly, as proved in the following proposition.

The procedure described above satisfies the following:
(a) For a given number of clusters n, it minimizes, over all possible clusterings, the maximum distance d of any point to its closest co-cluster point.
(b) For a given maximum distance d to the closest co-cluster point, it minimizes the number of clusters over all possible clusterings.

First recall that the algorithm views clusters as connected components on a sub-graph with distance-weighted edges on a complete graph with all the points as nodes. In support of these statements start with (b). Given d, one minimizes the number of clusters, or equivalently maximizes connectivity (since a cluster is a connected component on the graph), by adding all edges on the graph with edge length $e \leq d$. This is exactly what the algorithm does, which thus results in the minimum number of clusters.

With regard to statement (a), note that all edges that are absent in the n-clustering are longer than the value of d (max. dist. to closest co-cluster point) obtained from our algorithm. Any rearrangement of the clustering will necessarily require at least one currently absent edge to be included to preserve the connectedness of co-clustered nodes. It may, of course, also result in removal of currently present edges, but that does not affect the conclusion that the resulting added edge will increase the maximum distance to the closest co-cluster point to a value exceeding d.

The clustering algorithm of the present invention provides a clear mechanism to pick the number of clusters through a trade-off curve that provides an efficient spectrum of clustering options that trade-off simplicity with detail. Further, the simplicity of the algorithm and the resulting mathematical analyzability leads to efficient and flexible implementations that can accommodate a large variety of changes and adaptations—such as imposition of co-cluster or non-cluster constraints, incremental addition/deletion of cluster points, incremental changes in distance functions/values, parallel implementations etc.

Computational Results

In the following, we demonstrate the performance of the clustering algorithms using simple 2-dimensional examples that nevertheless pose a challenge for other currently popular algorithms such as K-means and classification trees.

EXAMPLE 1

Wedged Clusters

Figure 2:
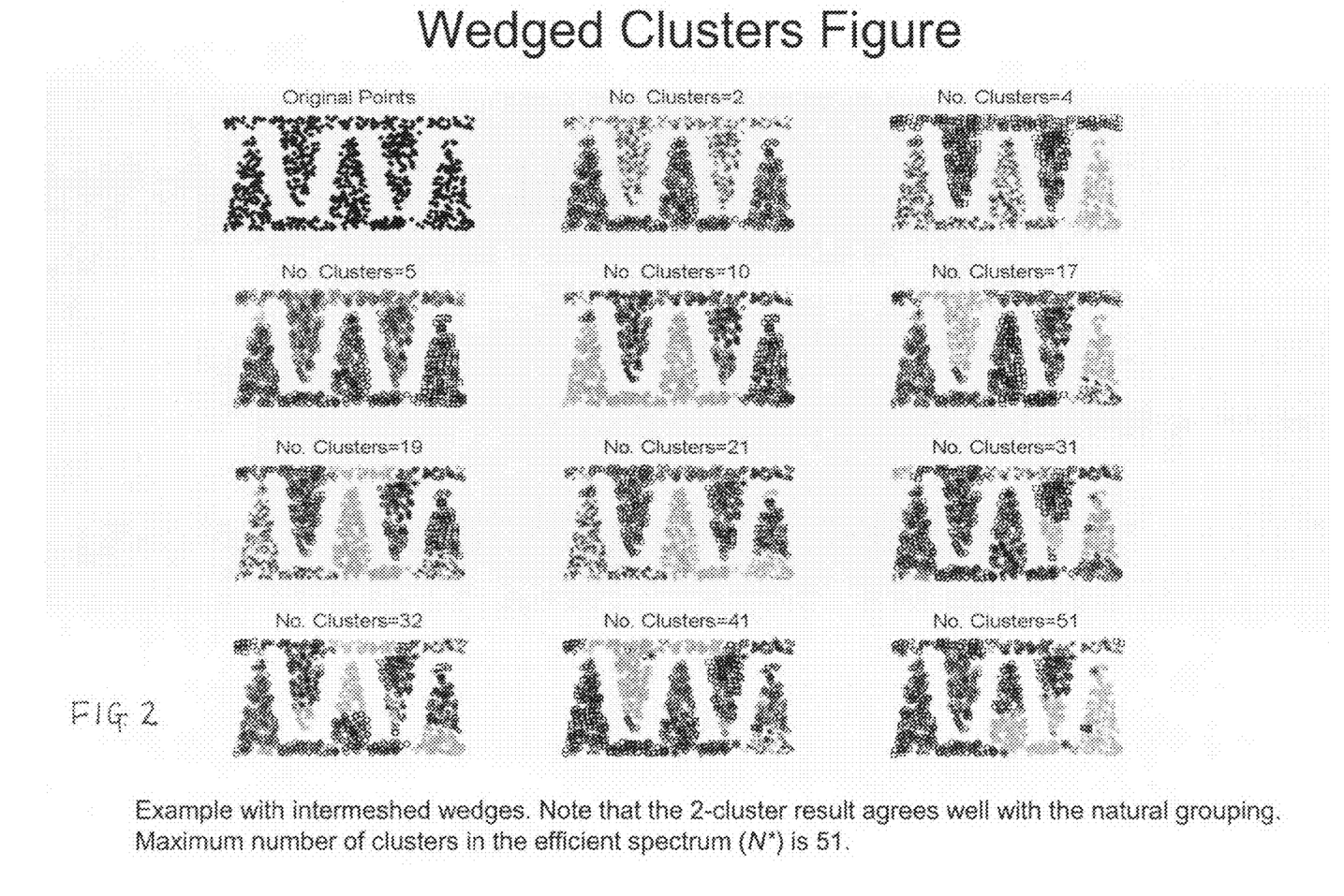
FIG. 2 shows an example of intermeshed wedges.

FIG. 2 shows an example of the present invention with intermeshed wedges. Note that the 2-cluster result agrees well with the natural grouping. This is due to the fact that connectivity-based clustering can assign seemingly distant points to the same cluster if there is a connecting path between the points through other closely spaced points. Conversely, nearby points may be assigned to different clusters in the absence of such a path. The distinction between cluster points may not be clearly visible in the grayscale image for the larger values of "No. Clusters", as color rendering is necessary to see them. Maximum number of clusters in the efficient spectrum ($N^*$) is 51.

Figure 3A:
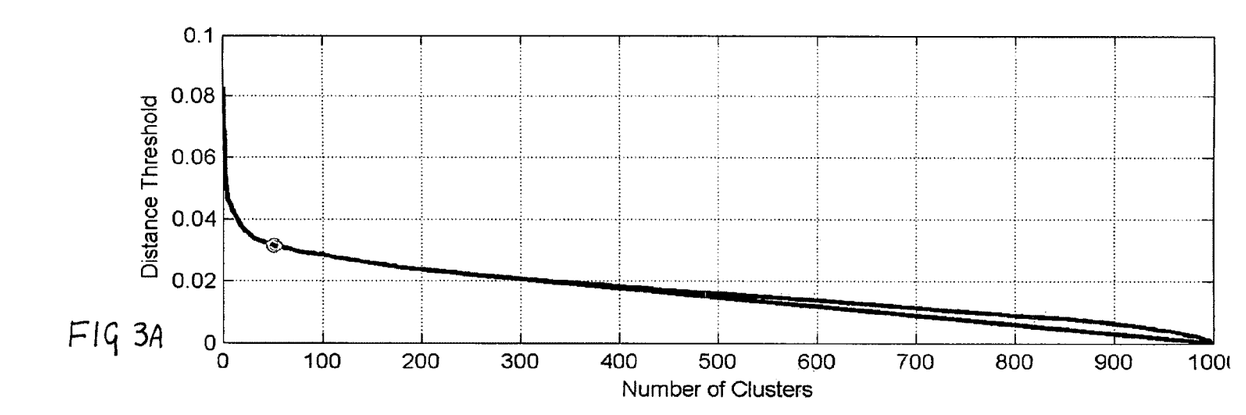
FIG. 3A shows distance threshold vs. number of clusters for Example 1.

FIG. 3A shows the trade-off curve and concave lower bound shows "knee" at 51 clusters.

Figure 3B:
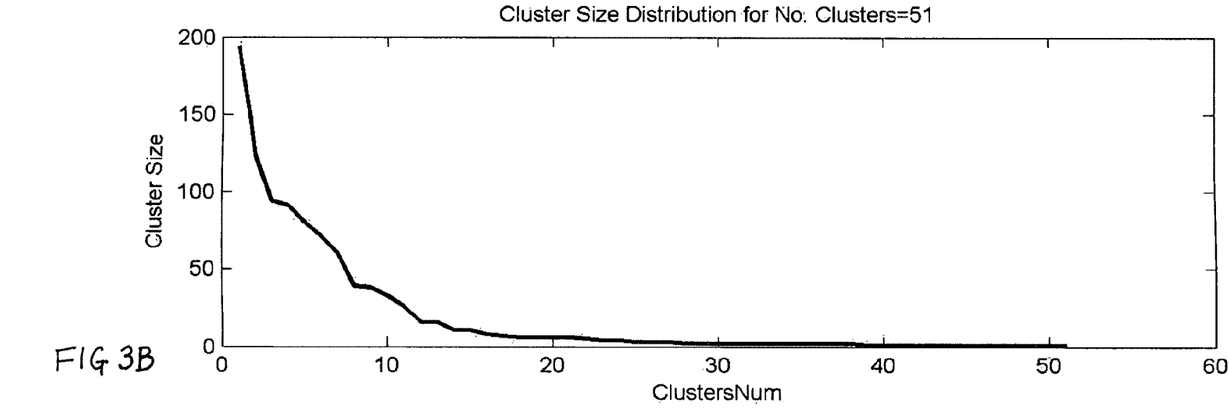
FIG. 3B shows cluster size distribution for Example 1.

FIG. 3B shows cluster size distribution for 51 clusters.

EXAMPLE 2

Concentric Clusters

Figure 4:
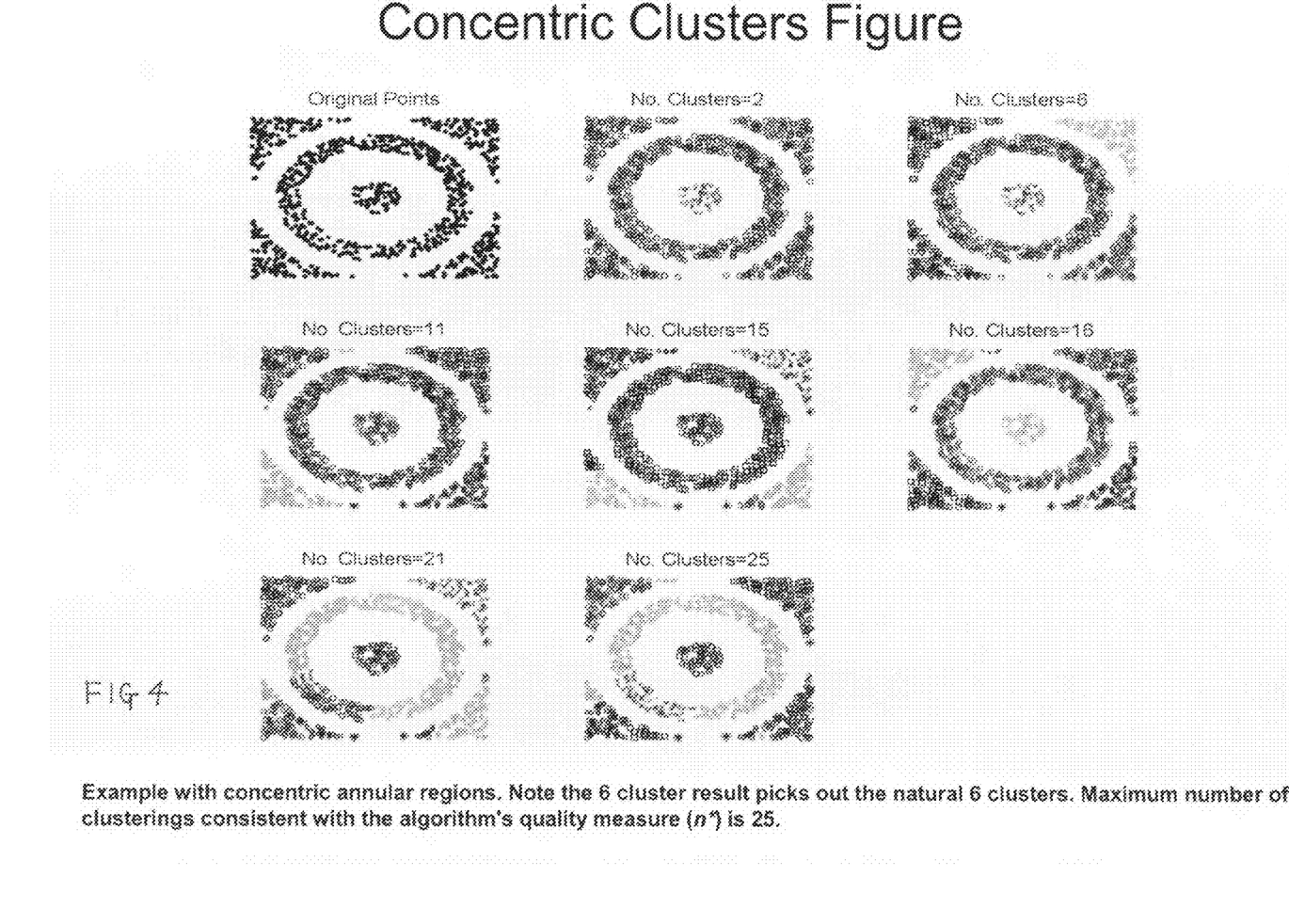
FIG. 4 shows an example of concentric annular regions.

FIG. 4 shows an example of the present invention with concentric annular regions. Each cluster in each figure is indicated by a different symbol and/or grayscale. Note the 6 cluster result picks out the natural 6 clusters. This is due to the fact that connectivity-based clustering can assign seemingly distant points to the same cluster if there is a connecting path between the points through other closely spaced points. Conversely, nearby points may be assigned to different clusters in the absence of such a path. The distinction between cluster points may not be clearly visible in the grayscale image for the larger values of "No. Clusters", as color rendering is necessary to see them. Maximum number of clusterings consistent with the algorithm's quality measure ($n^*$) is 25.

Figure 5A:
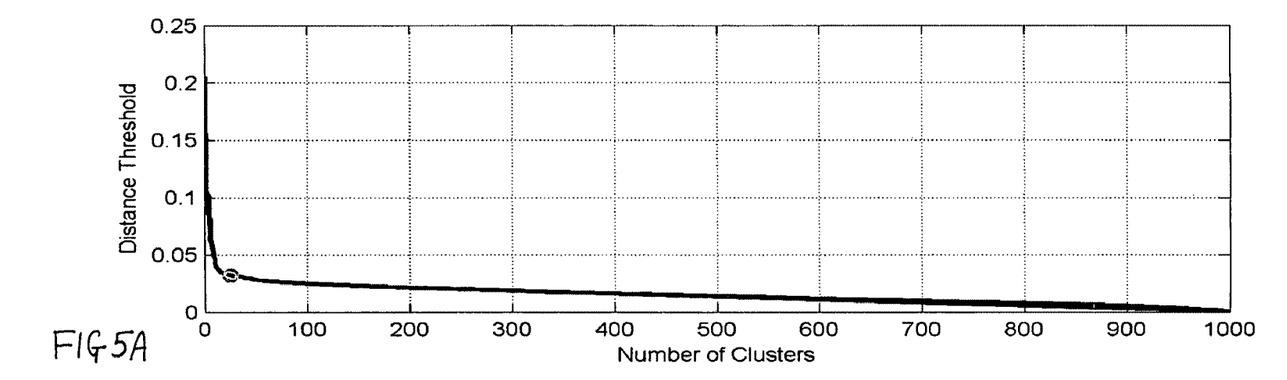
FIG. 5A shows distance threshold vs. number of clusters for Example 2.

FIG. 5A shows the trade-off curve and concave lower bound shows "knee" at 25 clusters.

Figure 5B:
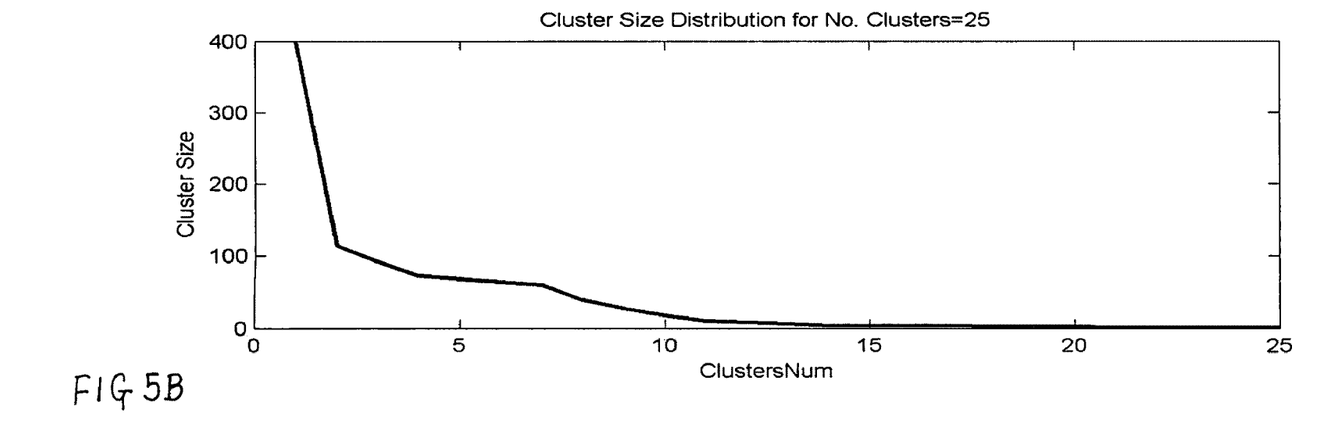
FIG. 5B shows cluster size distribution for Example 2.

FIG. 5B shows cluster size distribution for 25 clusters.

EXAMPLE 3

K-Means Algorithm

Figure 6:
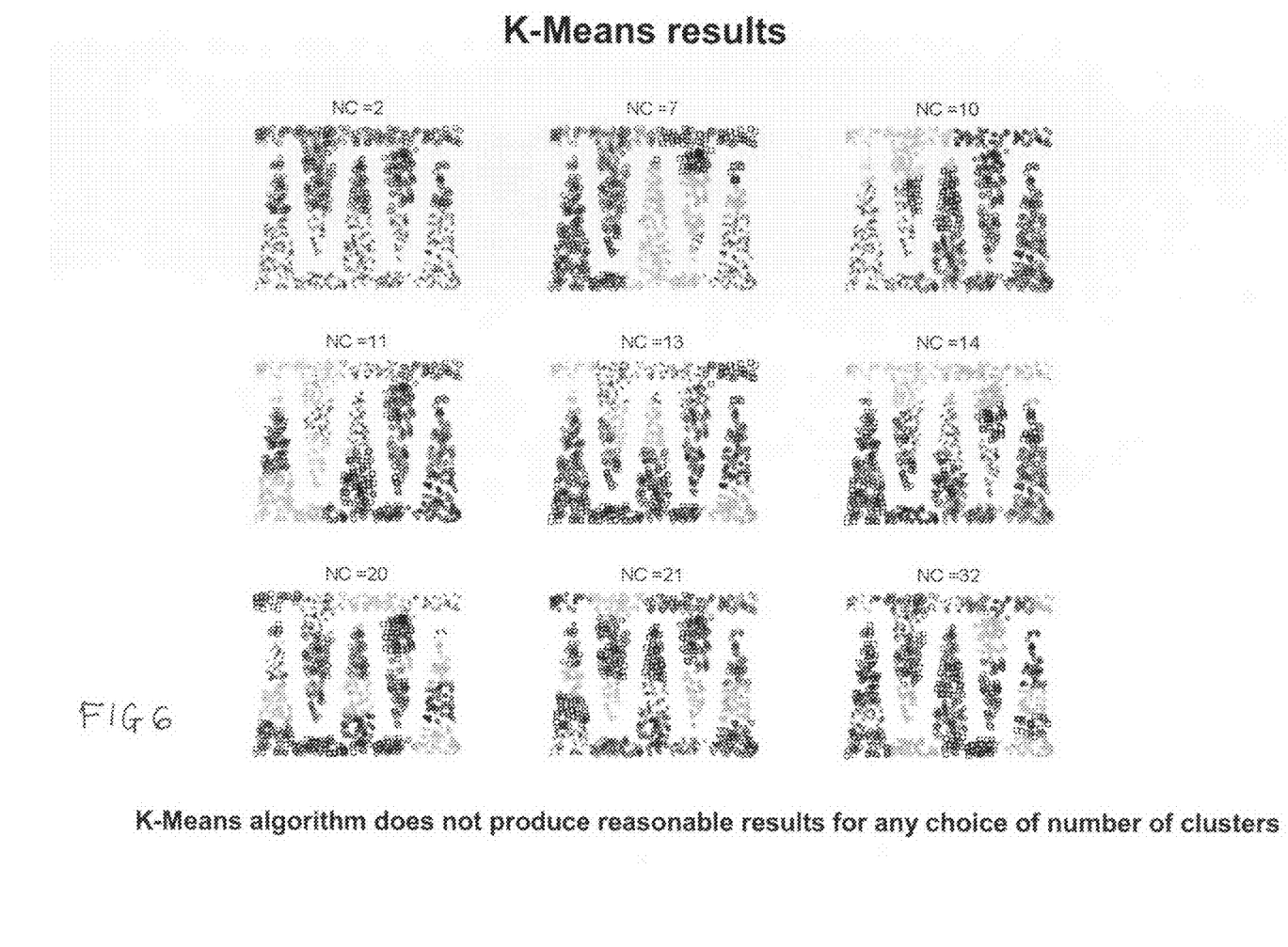
FIG. 6 shows the K-means algorithm applied to Example 1.
Figure 7:
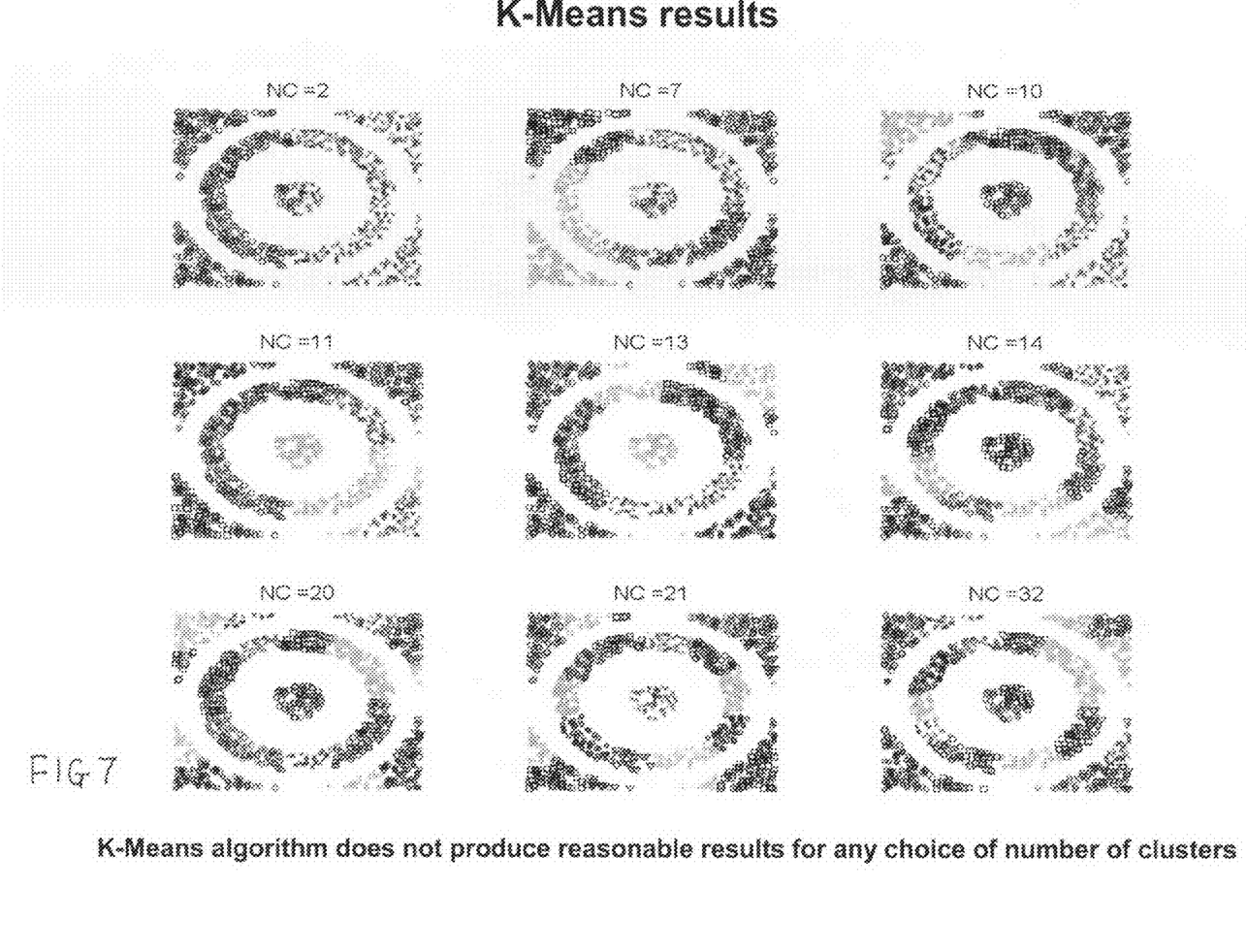
FIG. 7 shows the K-means algorithm applied to Example 2.

In this example, the most popular existing algorithm for clustering, known as the K-Means algorithm is applied to Example 1 (see FIG. 6) and Example 2 (see FIG. 7). It does not produce reasonable results for any choice of number of clusters. K-Means is an iterative algorithm that requires specification of number of clusters N in advance. Given N, it places N centroids randomly, and iterates the steps following steps till convergence (a) recompute clusters by assigning closest points assigned to each centroid (b) recompute centroid. Unlike our method, K-means, by construction, cannot produce "non-convex" clusters, like the annulus in the figure, and requires many iterations to produce all the clusterings.

Interactive Clustering

Figure 8A:
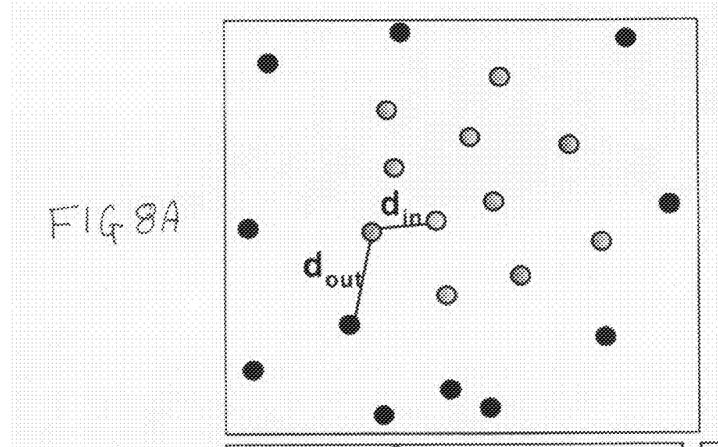
FIG. 8 shows how the compactness ratio is defined and the "relative spread" of the points in each cluster.
Figure 8B:
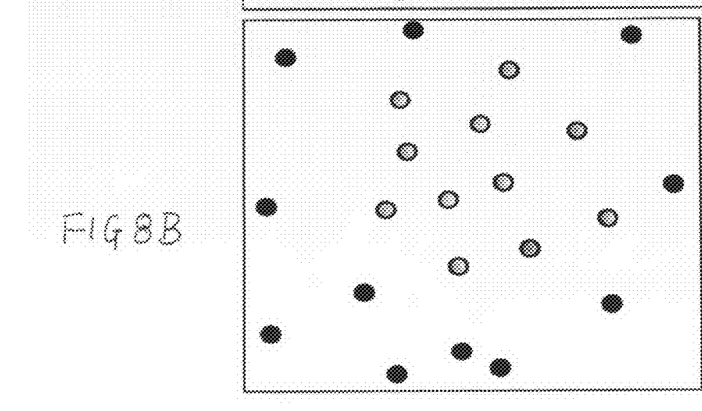
Figure 8C:
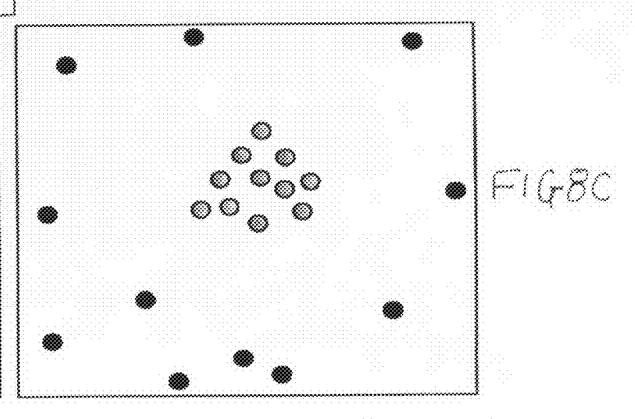

While the above-described clustering algorithm is capable of discovering natural clusters in data with a sufficiently high degree of sampling and low noise, it is desirable to design interactive methods to pick clusters in a quality sorted order when the data does not inherently contain clear clusters. To this end, we first note that our algorithm produces exactly N distinct clusters, out of the possible $2^N$. The following quality measure, called the compactness ratio, is used to sort these clusters: For each cluster C with points indexed by i,j compute $$r_i = \frac{d_{in}}{d_{out}} = \frac{\underset{j \in C_i}{\text{Min}} d_{ij}}{\underset{k \notin C_i}{\text{Min}} d_{ik}}; s_C = \underset{i \in C}{\text{Max}} r_i$$

where $d_{in}$ and $d_{out}$ are defined in FIG. 8A. This equation quantifies the "relative spread" of the points in each cluster, as shown in the FIGS. 8B and 8C.

The following iterative algorithm is then used to choose the clusters.

1. The clusters are presented to the user in increasing order of $s_C$.
2. The point distribution in each cluster is then manually examined using visualization such as a stacked multi-dimensional plot of the type shown, or perhaps other PCA-based methods. The plot shown below provides visualization of the presence/absence of uniformity of values in each coordinate value of the points within the cluster, and was the method of choice in our application described later. The vertical axis indexes the points in the cluster (numbering 20), while the horizontal indexes the coordinate of the points (187 dimensions in this case). The color indicates the magnitude of the corresponding coordinate for each point. The strong vertical streaks in the plot show that the cluster displays considerable internal homogeneity in coordinate values, which signifies a well-chosen cluster. A more random "checkerboard" pattern would indicate a poor cluster.
3. Based on the manual examination, the cluster is either accepted or rejected.
4. If accepted, the points contained in the cluster are removed from further consideration, following which there are 2 options:
    a. The complementary set of points are rendered in each of the remaining clusters, or
    b. The clustering algorithm is re-run on the complementary point set, which is more thorough but more computationally burdensome.
5. Successive clusters are presented until one of the following conditions occurs:
    a. All points have been included in the currently chosen set of clusters.
    b. All N clusters have been examined, or all remaining clusters are singletons. In these cases, a subset of the original data may remain un-clustered and a re-run of the clustering algorithm on this subset may be necessary.

Other sorting orders, such as just cluster size (number of points), a similar ratio without the distance in the denominator etc. are also useful in some cases. However this distance ratio will likely perform better when clear clusters exist in the data, in the sense that the top few clusters will cover provide the desired results and cover the points, which will in turn result in early termination of the interactive procedure.

The present invention is a novel clustering algorithm that can be implemented both in an unsupervised as well as user-guided fashion. The algorithm overcomes several short-comings of other state-of-the-art algorithms, most notably by eliminating the need to specify number of clusters beforehand and by providing more natural clusters regardless of their shape (convexity) or point distribution (Gaussian).

What is claimed is:

1. A method for arranging large datasets into clusters comprising:
    (a) obtaining a large dataset containing N data points specified by a length,
    (b) determining a distance $d_{ij}$ between the data points $$1, \ldots i, \ldots j, \ldots \frac{N(N-1)}{2},$$

(c) obtaining a relationship between distances and the number of clusters, wherein the distances are added in ascending order and the number of connected data points are the clusters, wherein said relationship is determined by the steps of plotting the relationship on a graph of distance versus number of clusters, joining the endpoints of the graph of said plotting step with a line and translating the line to the closest position from the origin where the intersection of the line with the graph is n*, d*, wherein n* is the number of clusters and d* is the longest distance of the nearest co-cluster points, or its mathematical and computer science equivalent of these steps for determining said relationship.

2. The method of claim 1 wherein said relationship between the distances and the number of clusters comprises:
    (a) arranging the distances $d_{ij}$ in ascending order, $$1, \ldots, \frac{N(N-1)}{2},$$

(b) initializing the number of clusters NC=N with longest distance max $d_{ij}$=0,
    (c) adding sequentially the distances $d_{ij}$ and determine the new max $d_{ij}$
    (d) determining if the newly added $d_{ij}$ causes the merging of clusters and if so let N →NC−1,
    (e) continuing until NC=1 or $$k = \frac{N(N-1)}{2}.$$

3. The method of claim 1 wherein step c is determined by $$(n^*, d^*) = \underset{d, n \in Conv.Env.}{\text{Arg Min}} \frac{n-1}{N-1} + \frac{d}{D}$$

Where n=number of clusters n=distance between clusters
n=maximum distance between clusters
n=number of data points 4. The method of claim 1 wherein for a number of clusters n, the maximum distance d of any point to its closest co-cluster point.

5. The method of claim 1 wherein for a maximum distance d to the closest co-cluster point, the number of clusters is minimized over all possible clusterings.

6. The method of claim 1 further comprising the steps of determining a quality measure for each of the clusters and determining if the cluster is accepted or rejected.

7. The method of claim 6 wherein said quality measure is given by $$r_i = \frac{d_{in}}{d_{out}} = \frac{\underset{j \in C_i}{\text{Min}} d_{ij}}{\underset{k \notin C_i}{\text{Min}} d_{ik}}; s_C = \underset{i \in C}{\text{Max}} r_i.$$

* * * * *